United States Patent [19]

Maier

[11] Patent Number: 4,807,912

[45] Date of Patent: Feb. 28, 1989

[54] PIPE COUPLING

[75] Inventor: Hans P. Maier, Zurich-Hoengg, Switzerland

[73] Assignee: Agintech AG, Zurich, Switzerland

[21] Appl. No.: 150,948

[22] Filed: Feb. 1, 1988

[30] Foreign Application Priority Data

Jan. 31, 1987 [DE] Fed. Rep. of Germany ....... 3702948

[51] Int. Cl.[4] ............................................. F16L 17/04
[52] U.S. Cl. ..................................... 285/348; 285/373; 285/383
[58] Field of Search ........................ 285/373, 383, 348

[56] References Cited

U.S. PATENT DOCUMENTS

| 2,225,208 | 12/1940 | Crickmer | 285/373 X |
| 2,562,359 | 7/1951 | Iredell | 285/383 X |
| 4,332,404 | 6/1982 | Huffman | 285/373 X |
| 4,400,018 | 8/1983 | Abbes et al. | 285/31 |
| 4,421,347 | 12/1983 | Kantor | 285/369 |
| 4,629,217 | 12/1986 | Straub | 285/112 |
| 4,648,633 | 3/1987 | Bergmann | 285/348 X |

FOREIGN PATENT DOCUMENTS

| 0205896 | 12/1986 | European Pat. Off. | |
| 2248361 | 4/1973 | Fed. Rep. of Germany | 285/373 |
| 3013312 | 11/1980 | Fed. Rep. of Germany | |
| 3038491 | 4/1982 | Fed. Rep. of Germany | 285/373 |
| 3202367 | 10/1982 | Fed. Rep. of Germany | |
| 3508287 | 9/1986 | Fed. Rep. of Germany | |

Primary Examiner—Dave W. Arola
Attorney, Agent, or Firm—Foley & Lardner, Schwartz, Jeffery, Schwaab, Mack, Blumenthal & Evans

[57] ABSTRACT

A pipe coupling for joining a first pipe to a second pipe, a pipe elbow, a fitting, a machine or the like. The coupling has at least two half shells which engage around the first pipe to form an axial gap and can be tightened against each other by a radially-acting tightening device. The half shells engage axially behind a coupling collar due to a radially inwardly projecting annular shoulder, and together with the collar enclose a sealing ring which is supported on the pipe wall by a radially acting sealing surface. A support ring is likewise enclosed by the half shells and is pushed loosely onto the first pipe. The half shells abut on the pipe wall of the first pipe with their inner wall which is provided with surface contourings, so that tightening of the tightening device leads to pressing of the surface contourings into the pipe wall. The sealing ring is pushed completely onto the first pipe and abuts against the planar end face of the coupling collar. The support ring, together with the planar end face of the coupling collar and the pipe wall, delimits an annular sealing chamber which is of approximately triangular cross section and which is under-dimensioned with respect to the external contour of the unloaded sealing ring, when the half shells are tightened against each other.

16 Claims, 3 Drawing Sheets

PIPE COUPLING

BACKGROUND OF THE INVENTION

The present invention relates to a pipe coupling for joining a first pipe to either a second pipe, a pipe elbow, a fitting, a machine or the like. In the coupling at least two half shells engage around the first pipe to form an axial gap, and the shells can be tightened against each other by radially-acting tightening means. The shells engage axially behind a coupling collar by means of a radially inwardly projecting annular shoulder, and together the shells and collar enclose a sealing ring which is supported on the pipe wall by a radially acting sealing surface and in the axial direction on the one side directly or indirectly by the coupling collar and on the other side by a support ring. The support ring is likewise enclosed by the half shells and is pushed loosely onto the first pipe. It is acted on in the axial direction by an inner cone of the half shells when the tightening means are tightened and thereby presses the sealing ring, which projects into a conical sealing chamber formed by the support ring, against the coupling collar.

An embodiment of this general type is disclosed in German Offenlegungsschrift (OS) No. 3,508,287. Various embodiments for pipe joints, fittings or machines are disclosed. A flange, a clamp element, and also a chamber part are pushed onto a pipe end that is to be butt-connected to a free pipe connection. The chamber part has a circular annular clamping chamber which is open toward the flange and into which the clamp element i pushed. The clamp element consists of a conical or convex disk supported with a radially internal clamping edge on the pipe wall and, with regard to its radially external clamping edge, having engaged over it an annular clamping surface of the clamping chamber. In the unloaded state, the clamp end projects out over the end face of the chamber part. The design of the clamping element is chosen here such that a force pressing the clamping element in an axial direction against the rear side of the clamping chamber leads to an increase in the external diameter, and simultaneously to a decrease in the internal diameter, of the clamping element. The chamber part is likewise provided with a sealing chamber respectively open toward the joint abutment and designed with a conical shape and thus tapered towards the neighboring flange. The joint abutment is enclosed by a seal, which is constructed as an elastomeric, shaped seal in which an inner ring is embedded. The external contour of the seal somewhat corresponds to that of the two sealing chambers but is overdimensioned, so that pressing together of the two chamber parts acts on the seal with a pressure directed axially and radially inwardly. In the embodiment according to FIG. 8 of this prior art document, the connecting means are formed by two half shells, which clampingly engage behind the two flanges. Here the flange on the pipe side has, on its side turned away from the chamber part, a conical shoulder against which abuts a correspondingly conically shaped strap of the half shells. Both half shells are provided with axial strap attachments, in order to be tightened against each other.

SUMMARY OF THE INVENTION

It is therefore an object of the present invention to provide an improved and a simply built pipe coupling of the general type described in the introductory portion of the specification.

In accomplishing this object, there has been provided according to the present invention a pipe coupling for joining a first pipe to a second generally cylindrical member, in a butt joint, comprising: at least two partial shell members which engage around the first pipe to form an axial gap therebetween; means for tightening the partial shell members against each other, including radially-acting tightening means; a coupling collar for surrounding the first pipe at the butt joint and including a radially outwardly extending member and having a planar end face facing the partial shell members; a support ring adapted to be loosely fitted onto the first pipe and enclosed by the partial shell members; a sealing ring comprising a profiled ring comprising (a) a radially acting sealing surface on which it is adapted to be supported on the first pipe, (b) an axially acting sealing surface with which it abuts in the axial direction on the planar end surface of the coupling collar, and (c) a jacket surface, in the form of a quadrant segment, joining together the two sealing surfaces, for abutting on the support ring; the partial shell members having a radially inwardly projecting annular shoulder for engaging axially behind the radially outwardly extending member of the coupling collar, and an inner conical surface which exerts an axial force on the support ring when the partial shell members are tightened by the tightening means, thereby pressing the sealing ring, which projects into the conical sealing chamber of the support ring, against the coupling collar; the partial shell members having an inner wall which comprises surface contourings in at least one section for abutting on the pipe wall of the first pipe, whereby tightening of the tightening means causes the surface contourings to be pressed into the pipe wall; and the supporting, together with the planar end face of the coupling collar and the pipe wall, defining an annular sealing chamber which is of approximately triangular cross section and which is under-dimensioned with respect to the external profile of the sealing ring, in an unloaded condition, when the partial shell members are tightened against each other.

Further objects, features and advantages of the invention will become apparent from the detailed description of preferred embodiments that follows, when considered together with the accompanying figures of drawing.

BRIEF DESCRIPTION OF THE DRAWINGS

FIG. 7 shows, in an illustration according to FIG. 1, a pipe coupling with a T-piece or the like.

DETAILED DESCRIPTION OF PREFERRED EMBODIMENTS

According to the invention, the following features are employed:

(a) the half shells abut on the pipe wall of the first pipe with the inner wall and are provided with surface contourings, of a bushing-shaped section, so that tightening of the tightening means leads to pressing of the surface contourings into the pipe wall;

(b) the sealing ring consists of a shaped ring pushed completely onto the first pipe so that it abuts by means of an axially acting sealing surface which lies preferably at a right angle to the radially acting sealing surface, against the planar end face of the coupling collar. The sealing ring has a jacket surface, in the form of a quadrant segment, joining together its two sealing surfaces;

(c) the support ring, together with the planar end face of the coupling collar and the pipe wall, delimits an annular sealing chamber which is of approximately triangular cross section and which is under-dimensioned with respect to the external contour of the unloaded sealing ring when the half shells are tightened against each other.

Thus according to the invention, the half shells, together with the coupling collar and the sealing ring, include only one support ring, which can be a conical annular disk and can consist of plastic. This light and inexpensive disk thus replaces the loosely pushed-on flange required in the prior art embodiment and also the similarly pushed-on chamber part. The surface contourings integrated into the half shells make the use of a separate clamping ring superfluous. The surface contourings according to the invention can be distributed over a larger surface, so that the construction according to the invention is particularly suitable for plastic pipes. The sealing ring according to the invention has only half the cross section in comparison with the prior art embodiment.

Known tightening means can be used for tightening the half shells. Thus, for example, the half shells could be provided with axial strap 15 attachments which are tightened against each other by screws, clamps or the like. However, it will mostly be appropriate for the tightening means to include a tightening strap looped around the bushing-shaped section of the two half shells. The pressure can be brought by this means to bear over a wide surface and directly in the region of the surface contourings.

If the pipe coupling according to the invention is used to connect two pipes, it is advantageous for the coupling collar to be formed by one of the U-shank of a coupling ring having a U-shaped cross section. The coupling ring engages over the two pipes with its U-web.

Further features of the invention are explained in more detail below, in connection with further advantages of the invention, with the aid of exemplary embodiments.

The term "half shell" is not limited to shells extending over about 180° of the periphery. For example, three or four half shells can also be utilized, which then extend over about 120° or 90°, respectively.

Figure 1:
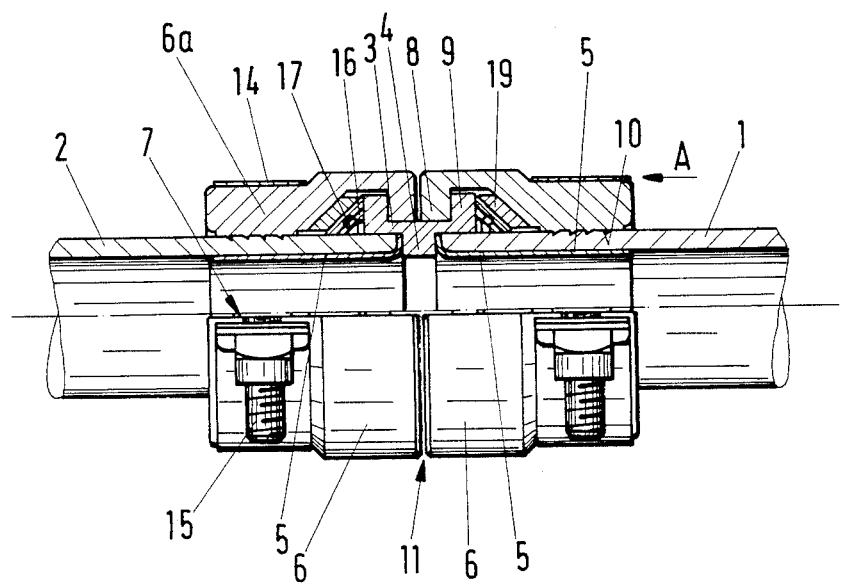
FIG. 1 shows a coupling between two pipes, in longitudinal section and also in side view.

FIG. 1 shows a pipe coupling for joining a first pipe 1 to a second pipe 2. A coupling ring 3 is arranged between the two pipes 1, 2 and is U-shaped in cross section, with its U-web engaging over the two pipes 1, 2 and with an annular stop 4 projecting between the two ends of the pipes 1, 2. To reinforce the pipes, which consist of plastic in the embodiment shown, a support sleeve 5 is pushed into their ends in the coupling region. Two half shells 6 are associated with each of the two pipes 1, 2 and engage around the associated pipe, forming between them an axially extending gap 7. They can be tightened against each other by radially-acting tightening means, and they by means of an annular collar 8 which projects radially inwardly, engage axially behind a coupling collar 9 formed by one of the U-shanks of the coupling ring 3. Together the shells surround a sealing ring.

Figure 4:
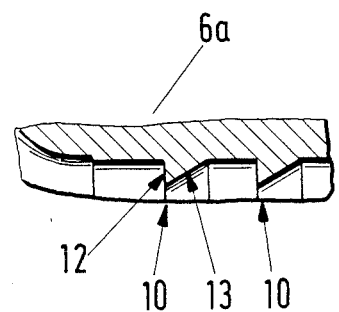
FIG. 4 shows a detail of Figure on an enlarged scale.

The inner walls of the half shells 6 are provided with surface contourings, in a bushing-shaped section 6a, and the half shells 6 abut on the pipe wall of the associated pipe, so that tightening of the tightening means results in pressing of the surface contourings into the pipe wall. It can be seen from FIG. 4 that the surface contourings are teeth 10 which are arranged in the radial plane in the form of circular segments The flank 12 of each tooth, facing the joint abutment 11 stands perpendicularly with respect to the pipe axis, and or the opposite side there is a rearward flank which runs out flat. This design substantially prevents the associated pipe from being pulled out of the half shells 6 which are tightened against each other.

Figure 2:
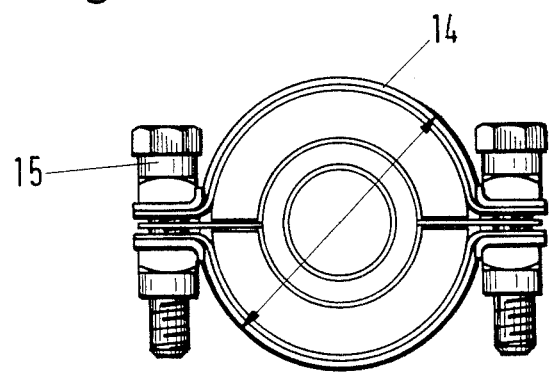
FIG. 2 shows the pipe coupling of FIG. 1, in end view.

The tightening means comprise a tightening strap 14 which is looped around the bushing-shaped section 6a of the two half shells 6 and which can be tightened by means of tightening screws (see FIG. 2).

The two cooperating half shells 6 surround in common a sealing ring, which consists of an elastomeric shaped ring 16 and an inner ring 17 inserted loosely into a matching annular groove of the shaped ring 16. The sealing ring is supported on the pipe wall by means of a radially-acting sealing face 18 and, in the axial direction, on the one side by the coupling collar 9 and on the other side by a support ring 19 which is loosely pushed onto the associated pipe and is likewise surrounded by the half shells 6. The support ring 19 is constructed as a conical annular disk which is in contact on the side remote from the joint abutment 11 with an inner cone 20 of the half shells 6. When the tightening strap 14 is tightened, the support ring 19 is therefore acted on in an axial direction and hence presses the sealing ring 16, 17, which projects into a conical sealing chamber formed by the support ring 19, against the coupling collar 9.

The shaped ring 16 of the sealing ring is completely pushed onto the associated pipe and abuts, by means of an axially-acting sealing face 21 which is preferably oriented at a right angle to the radially-acting sealing face 18, on the planar end face of the coupling collar 9. The shaped ring 16 also has a jacket surface 22, in the form of a quadrant segment, which connects together its two sealing surfaces 18, 21.

The support ring 19, together with the planar end face of the coupling collar 9 and the pipe wall, delimits an annular sealing chamber which is of approximately triangular cross section and which is under-dimensioned with respect to the external contour of the unloaded (i.e., uncompressed sealing ring when the half shells are tightened against each other.

Figure 3:
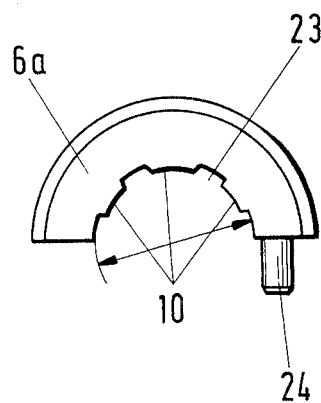
FIG. 3 shows a half shell in end view according to the arrow A in FIG. 1.

FIG. 3 shows the end of the bushing-shaped section 6a of a half shell 6. The inner wall of this bushing-shaped section 6a has grooves 23 which run axially and between which lie the teeth 10 shaped as circular segments. Furthermore, it can be seen from FIG. 3 that the two half shells 6 inter-engage in the axial gap 7 by means of pins 24. When the half shells consist of plastic, each half shell can have a pin 24 made integrally with it and an associated corresponding blind hole or the like in the other half shell.

Figure 6:
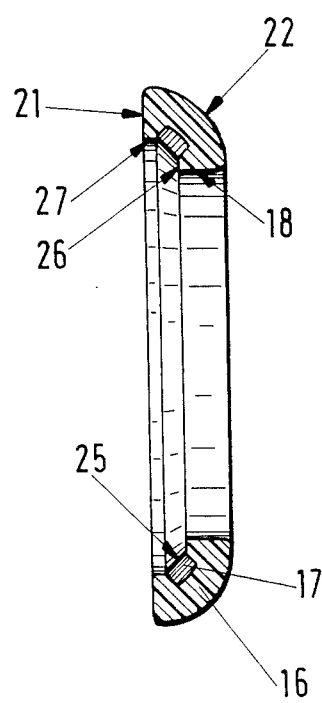
FIG. 6 shows the sealing ring according to FIG. 5, in cross section.
Figure 5:
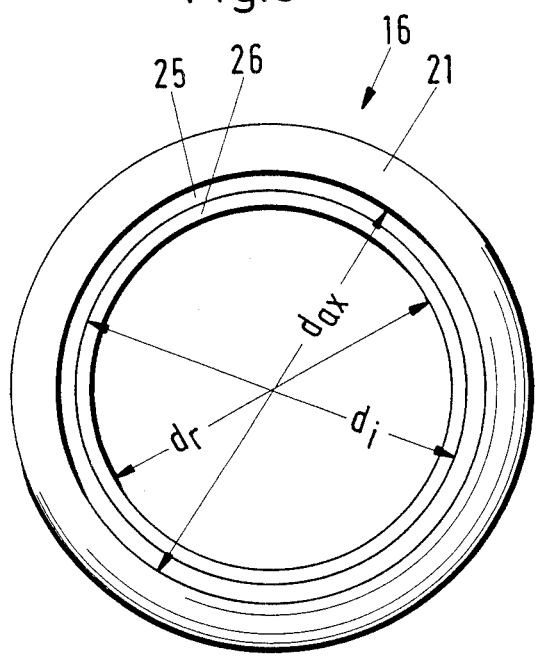
FIG. 5 shows a plan view of a sealing ring, on an enlarged scale.

It can be seen from FIGS. 5 and 6 that the open internal diameter $d_{ax}$ of the axially-acting annular sealing surface 21 is larger than the diameter dr of the radially acting sealing surface 18. The shaped ring 16 forms a narrow annular radial surface and axial surface 26, 27 between its two sealing surfaces 18, 21 and the visible inner jacket surface 25 of the inner ring 17 lies opposite its convex jacket surface 22.

Figure 7:
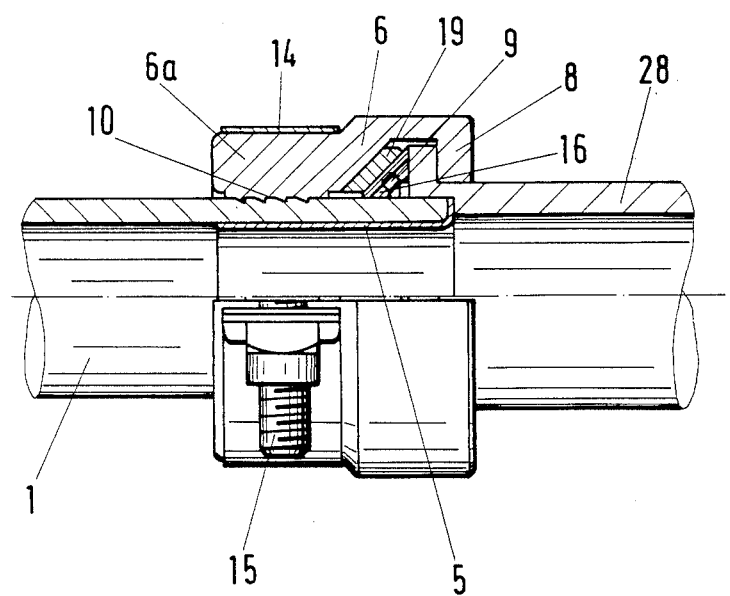

FIG. 7 shows a pipe coupling for joining a first pipe 1 to a T-piece 28, which can be an elbow, crosspiece or the like. It is clear from this embodiment that only one coupling collar 9 with a planar end face is required for use of the pipe coupling according to the invention This coupling collar can be a part of a fitting, a machine or a pipe fitting.

What is claimed is:

1. A pipe coupling for joining a first pipe to a second generally cylindrical member, in a butt joint, comprising:
   at least two partial shell members which engage around the first pipe to form an axial gap therebetween;
   means for tightening the partial shell members against each other, including radially-acting tightening means;
   a coupling collar for surrounding the first pipe at the butt joint and including a radially outwardly extending member having a planar end face facing said partial shell members;
   a support ring adapted to be loosely fitted onto the first pipe and enclosed by said partial shell members;
   a sealing ring comprising a profiled ring comprising (a) a radially acting sealing surface on which it is adapted to be supported on the first pipe, (b) an axially acting sealing surface with which it abuts in the axial direction on said planar end surface of said coupling collar, and (c) a jacket surface, in the form of a quadrant segment, joining together said two sealing surfaces, for abutting on said support ring;
   said partial shell members having a radially inwardly projecting annular shoulder for engaging axially behind said radially outwardly extending member of the coupling collar, and an inner conical surface which exerts an axial force on said support ring when said partial shell members are tightened by said tightening means, thereby pressing the sealing ring, which projects into the conical sealing chamber of the support ring, against the coupling collar;
   said partial shell members having an inner wall which comprises surface contourings in at least one section for abutting on the pipe wall of the first pipe, whereby tightening of the said tightening means causes the surface contourings to be pressed into the pipe wall; and
   the support ring, together with the planar end face of the coupling collar and the pipe wall, defining an annular sealing chamber which is of approximately triangular cross section and which is under-dimensioned with respect to the external profile of the sealing ring, in an unloaded condition, when the partial shell members are tightened against each other.

2. A pipe coupling according to claim 1, wherein the sealing ring comprises an elastomeric shaped ring having an embedded inner ring.

3. A pipe coupling according 2, wherein the inner ring is inserted loosely into a matching annular groove of the shaped ring.

4. A pipe coupling according to claim 3, wherein the annular groove receiving the inner ring lies with an open side opposite the jacket surface of the shaped ring.

5. A pipe coupling according to claim 3, wherein the floor of the annular groove which receives the inner ring is arched out approximately parallel to the jacket surface of the shaped ring.

6. A pipe coupling according to claim 2, wherein the shaped ring comprises a narrow annular radial surface and an axial surface between its two sealing surfaces, and the inner ring has a visible inner jacket surface lying opposite its convex jacket surface.

7. A pipe coupling according to claim wherein the axially-acting annular sealing surface of the sealing ring has an open internal diameter ($d_{ax}$) larger than the diameter (dr) of the radially acting sealing surface.

8. A pipe coupling according to claim 6, wherein a smallest open internal diameter (dI) of the inner ring is larger than the diameter (dr) of the radially acting sealing surface.

9. A pipe coupling according to claim 1, wherein the said tightening means comprises a tightening strap looped around the at least two partial shell members.

10. A pipe coupling according to claim 1, wherein the said support ring comprises a conical annular disk.

11. A pipe coupling according to claim 1, wherein the partial shell members interengage in the said axial gap by means of pins.

12. A pipe coupling according to claim 1, wherein the partial shell members comprise plastic.

13. A pipe coupling according to claim 1, wherein said second member comprises a second pipe and the coupling collar comprises a member having a generally U-shaped cross section, which engages over the two pipes with its U-web.

14. A pipe coupling according to claim 13, wherein the coupling collar comprises an annular stop which fits between the abutting ends of the two pipes.

15. A pipe coupling according to claim 1, wherein the said surface contourings comprise teeth which are arranged in the radial plane in the form of circular segments and having a flank facing the butt joint and standing perpendicularly with respect to the pipe axis and further having a rearward flank which runs out flat.

16. A pipe coupling according to claim further comprising a support sleeve pushed into the end of the pipe to be coupled.

* * * * *

UNITED STATES PATENT AND TRADEMARK OFFICE
CERTIFICATE OF CORRECTION

PATENT NO.   : 4,807,912

DATED        : February 28, 1989

INVENTOR(S)  : Hans Paul MAIER

It is certified that error appears in the above-identified patent and that said Letters Patent is hereby corrected as shown below:   On the title page:

In [73] Assignee:

"Agintech AG" should read --Agintec AG--.

Signed and Sealed this

Tenth Day of April, 1990

Attest:

HARRY F. MANBECK, JR.

*Attesting Officer*     *Commissioner of Patents and Trademarks*